US012637044B2

(12) United States Patent
Hagvall et al.

(10) Patent No.: US 12,637,044 B2
(45) Date of Patent: May 26, 2026

(54) EMERGENCY MANEUVERING BASED ON A PRE-DETERMINED AXLE BRAKE TORQUE DIFFERENCE

(71) Applicant: VOLVO TRUCK CORPORATION, Gothenburg (SE)

(72) Inventors: Linus Hagvall, Gothenburg (SE); Stefan Bergquist, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 155 days.

(21) Appl. No.: 18/559,651

(22) PCT Filed: May 10, 2021

(86) PCT No.: PCT/EP2021/062377
§ 371 (c)(1),
(2) Date: Nov. 8, 2023

(87) PCT Pub. No.: WO2022/237961
PCT Pub. Date: Nov. 17, 2022

(65) Prior Publication Data
US 2024/0227754 A1     Jul. 11, 2024

(51) Int. Cl.
*B60T 8/17* (2006.01)
*B60T 17/08* (2006.01)
*B60W 10/18* (2012.01)

(52) U.S. Cl.
CPC .......... *B60T 8/1708* (2013.01); *B60T 17/086* (2013.01); *B60W 10/182* (2013.01);
(Continued)

(58) Field of Classification Search
CPC .. B60T 8/1708; B60T 17/086; B60W 10/182; B60W 2300/125; B60W 2300/145;
(Continued)

(56) References Cited

U.S. PATENT DOCUMENTS 7,269,493 B2 * 9/2007 Uemura .............. B60T 8/17557
340/436
7,318,629 B1 1/2008 Sun et al.
(Continued)

FOREIGN PATENT DOCUMENTS

DE 102019102830 A1 8/2020
WO WO-2011123023 A1 * 10/2011 ................ B60T 7/18
(Continued)

OTHER PUBLICATIONS

International Search Report and Written Opinion of the International Searching Authority in corresponding International Application No. PCT/EP2021/062377 mailed Jan. 31, 2022 (14 pages).
(Continued)

*Primary Examiner* — Mark L. Greene
(74) *Attorney, Agent, or Firm* — Jeffri A. Kaminski; Venable LLP

(57) ABSTRACT

A minimum risk maneuver brake system for a heavy-duty vehicle is described. The brake system comprising a first axle comprising a left wheel braking device and a right wheel braking device, where the braking devices are configured to apply a pre-determined difference in brake torque over the axle in response to a brake signal.

13 Claims, 4 Drawing Sheets

(52) U.S. Cl.
CPC . *B60W 2300/125* (2013.01); *B60W 2300/145* (2013.01); *B60W 2710/18* (2013.01); *B60W 2900/00* (2013.01)

(58) Field of Classification Search
CPC .......... B60W 2710/18; B60W 2900/00; G05D 1/0061; G05D 1/0088; G05D 1/021; G05D 1/0214; G05D 1/0221; G05D 1/0223
See application file for complete search history.

(56) References Cited

U.S. PATENT DOCUMENTS

| | | | |
|---|---|---|---|
| 11,891,092 B2 * | 2/2024 | Kuemmel ....... | B60W 60/00186 |
| 2006/0142921 A1 | 6/2006 | Takeda | |
| 2011/0231052 A1 | 9/2011 | Ellis et al. | |
| 2012/0283907 A1 | 11/2012 | Lee et al. | |
| 2013/0253793 A1 | 9/2013 | Lee et al. | |
| 2016/0325721 A1 | 11/2016 | Jonasson et al. | |
| 2017/0313309 A1 | 11/2017 | Morales Teraoka | |
| 2018/0362013 A1 | 12/2018 | Ungermann | |
| 2019/0168803 A1 | 6/2019 | Miller et al. | |
| 2019/0256064 A1 | 8/2019 | Hecker et al. | |
| 2020/0039580 A1 | 2/2020 | Redeker et al. | |
| 2020/0156624 A1 | 5/2020 | Witte | |
| 2020/0216045 A1 | 7/2020 | Rothhämel et al. | |
| 2020/0290588 A1 | 9/2020 | Källstrand et al. | |
| 2021/0009162 A1 | 1/2021 | Hecker et al. | |

FOREIGN PATENT DOCUMENTS

| | | |
|---|---|---|
| WO | 2017076436 A1 | 5/2017 |
| WO | 2018141719 A1 | 8/2018 |

OTHER PUBLICATIONS

Preliminary Report on Patentability in corresponding International Application No. PCT/EP2021/062377 mailed Jun. 9, 2022 (6 pages).
European Communication pursuant to Article 94(3) dated Dec. 5, 2024 in corresponding European Patent Application No. 21726594. 1, 4 pages.
European Communication pursuant to Rules 161(1) and 162 EPC dated Dec. 19, 2023 in corresponding European Patent Application No. 21726594.1, 3 pages.
European Communication pursuant to Article 94(3) EPC dated Jun. 26, 2025 in corresponding European Patent Application No. 21726594. 1, 5 pages.

* cited by examiner

100

110

120

130

140

200

220

210

!

100

300

310

D

100

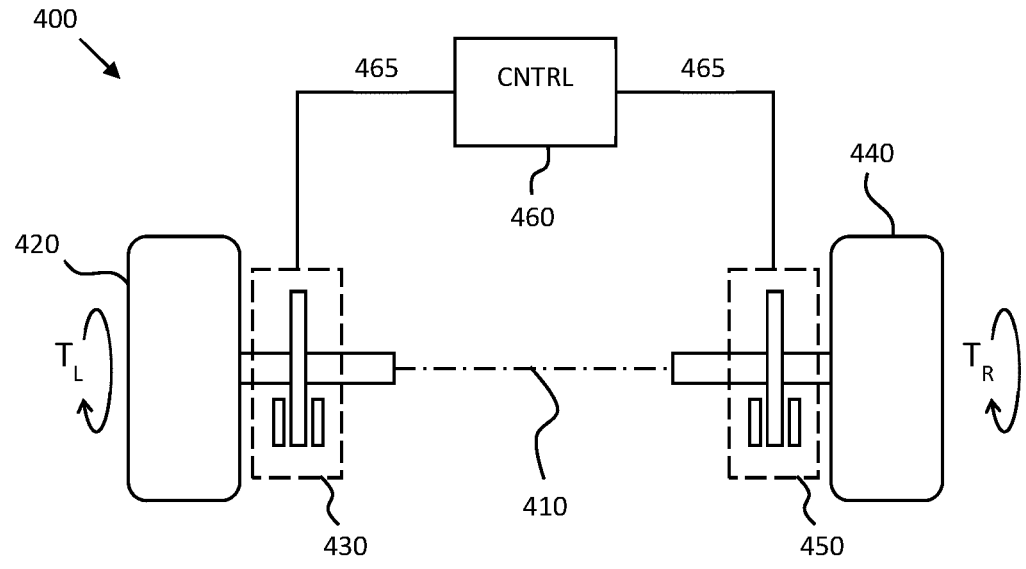
FIG. 4
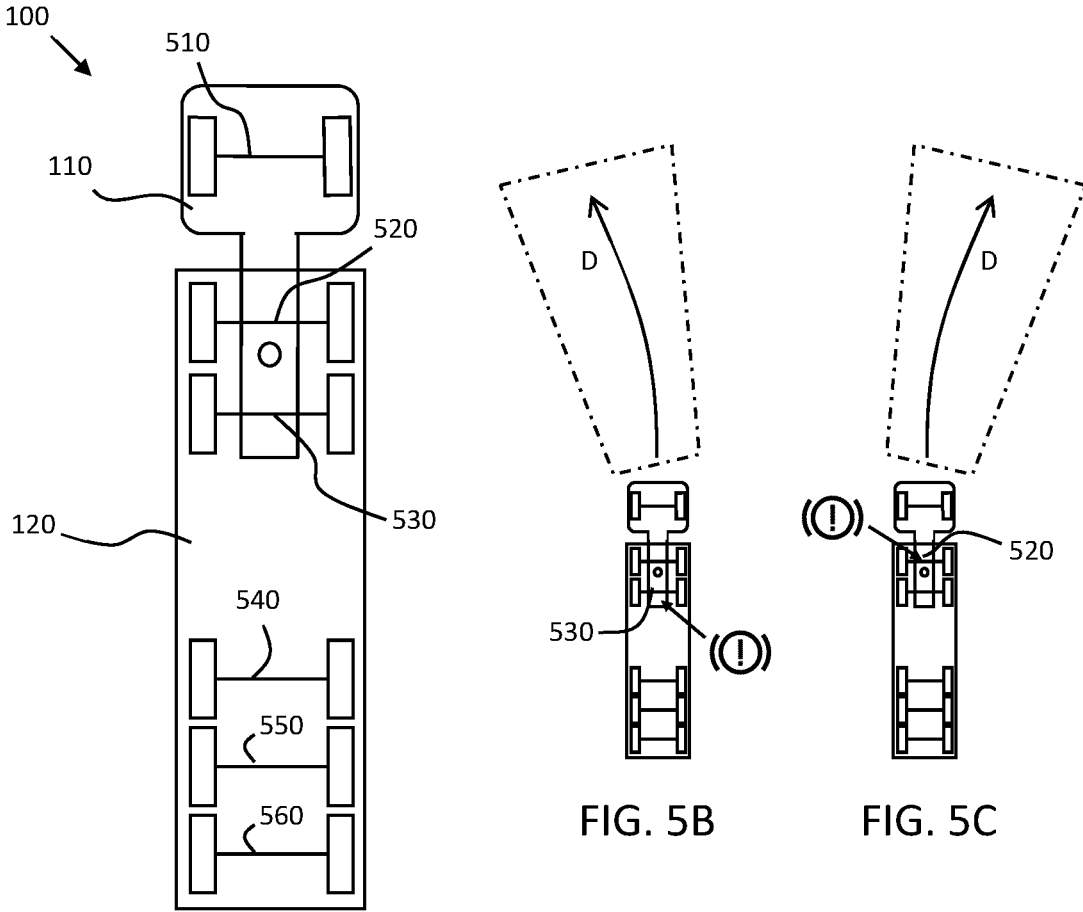
FIG. 5A
FIG. 5B        FIG. 5C

EMERGENCY MANEUVERING BASED ON A PRE-DETERMINED AXLE BRAKE TORQUE DIFFERENCE

CROSS-REFERENCE TO RELATED APPLICATIONS

This application is a U.S. National Stage application of PCT/EP2021/062377, filed May 10, 2021 and published on Nov. 17, 2022, as WO 2022/237961, all of which is hereby incorporated by reference in its entirety.

TECHNICAL FIELD

The present disclosure relates primarily to heavy-duty vehicles, such as trucks and semi-trailer vehicles, although the techniques disclosed herein can also be used in other types of vehicles. There are disclosed arrangements for minimum risk maneuvers such as emergency braking.

BACKGROUND

Automated vehicles, such as vehicles comprising advanced driver assistance functions (ADAS) and vehicles arranged for autonomous drive (AD) are being developed. However, developing an automated vehicle is a challenging task, since even relatively simple use-cases such as remaining in a lateral corridor (e.g. a lane) can be very difficult, especially on the topic of proving that the system is safe.

One part of proving safety is to show that all relevant faults which can occur are able to be handled in a safe way, typically referred to as functional safety. One fault (with many potential root causes) is that the ego vehicle's steered wheels are pointing in the wrong direction. One example of why this problem differs for automated vehicles is that in a manually driven vehicle there is often a physical connection between the steering wheel and the axle. The result is even if the electric steering system fails the vehicle will still turn through the physical connection. When a truck is automatically driven there is no human present to turn the steering wheel, and as such it is difficult to rely on the physical connection as a backup.

A common fault handling solution is to brake hard until the vehicle stops. However, to ensure strict safety, the speed of the vehicle would always have to be low enough such that for all possible fault conditions, it is feasible to stop the ego vehicle before it reaches an unsafe position, e.g., a position outside of the road or in a lane with oncoming traffic. Unless all "unsafe positions" are far away this would quickly result in the vehicle always driving very slowly.

Steer by braking systems are known, see, e.g., US 2020/0290588 A1. These systems provide a level of redundancy which alleviate the problems with faulty steering to some extent.

Steer by braking systems are known, see, e.g., US 2020/0290588 A1. These systems provide a level of redundancy which alleviate the problems with faulty steering to some extent.

US 2019/256064 A1 discloses a method and a device for controlling a movement of a vehicle.

WO 2017/076436 A1 discloses a control system and method for a vehicle comprising an autonomous emergency braking system.

However, further improvement to the safety systems in heavy-duty vehicles are desired in order to realize the full potential in automated vehicles.

However, further improvement to the safety systems in heavy-duty vehicles are desired in order to realize the full potential in automated vehicles.

SUMMARY

It is an object of the present disclosure to provide further redundancy to braking systems for minimum risk maneuvering. This object is at least in part obtained by a minimum risk maneuver brake system for a heavy-duty vehicle. The brake system comprises a first axle comprising a left wheel braking device and a right wheel braking device, where the braking devices are configured to apply a pre-determined difference in brake torque, at least initially, over the first axle in response to a brake signal.

This way the motion of the vehicle during the brake maneuver can be biased to the left or to the right, according to the pre-determined difference in brake torque. The behavior of the vehicle can thereby be tailored for a specific use case, such as driving on a free-way without oncoming traffic. The pre-determined difference in brake torque over the first axle can for instance be pre-configured in dependence of an automation use-case of the heavy-duty vehicle. The pre-determined difference in brake torque may be efficiently implemented in a cost-effective manner, e.g., by different spring forces and/or by a time-difference in applied braking torque.

According to aspects, the difference in brake torque over the first axle is configured in dependence of a preferred drift direction by the vehicle during an emergency brake maneuver. The preferred drift direction for a single unbalanced axle may be either left or right. Although rudimentary, this drift direction may permit the vehicle to maintain higher velocity while still meeting safety requirements in a given use-case.

According to aspects, the left wheel braking device and the right wheel braking device form part of a parking brake system of the vehicle. The parking brake system of a vehicle does not suffer from an unbalanced brake torque since it is normally applied when the vehicle is stationary, i.e., parked. Thus, the parking brake system can be re-used also for the purpose of providing improved emergency braking capabilities by the vehicle.

According to aspects, the brake system also comprises a second axle with a left wheel braking device and a right wheel braking device, where the braking devices of the second axle are configured to apply a pre-determined difference in brake torque over the second axle. Thus further redundancy is provided, which is an advantage.

According to aspects, the pre-determined difference in brake torque over the second axle is of different sign compared to the pre-determined difference in brake torque over the first axle. This way a rudimentary steering capability is provided since the vehicle may selectively engage the brake systems of the first and second axles in order to steer the vehicle during the brake maneuver. Also, the vehicle is now capable of selecting which way to drift during the emergency maneuver.

The object is also obtained by a control unit arranged for vehicle motion management (VMM) of a heavy-duty vehicle. The control unit comprises a minimum risk maneuver (MRM) control module configured to assist in performing an MRM, wherein the MRM control module is arranged to obtain data associated with a brake system of the vehicle, where the data is indicative of a pre-determined difference in brake torque over a first axle of the vehicle. This way the possibilities for maneuvering by applying the brake systems disclosed herein are made available to the VMM, which is an advantage. Optionally, the data is also indicative of a pre-determined difference in brake torque over a second axle of the vehicle, wherein the control unit is arranged to perform motion support device (MSD) coordination to steer the vehicle during a minimum risk maneuver by selectively applying brake torque by the brake system on the first axle and on the second axle. This way the VMM obtains the option to steer the vehicle using the brake systems disclosed herein, which increases the capability of the vehicle. The VMM system also attains an increased level of redundancy, since it is now able to affect emergency braking and steering independently of a primary steering system of the vehicle, and also independently of a primary service brake system of the vehicle. Thus, the VMM may steer the vehicle by its normal power-steering function, using a steer-by-braking control based on service brakes, as well as steering by the brake systems disclosed herein, which are advantageously integrated with the parking brakes of the vehicle.

There is also disclosed herein control units, vehicles, computer readable media, and computer program products associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings:

FIG. 4 shows an example vehicle axle with pre-configured uneven braking torque;

FIGS. 5A-C illustrate a heavy-duty vehicle with a plurality of braked axles;

DETAILED DESCRIPTION OF EXAMPLE EMBODIMENTS OF THE INVENTION

Figures 1, 2, 3:
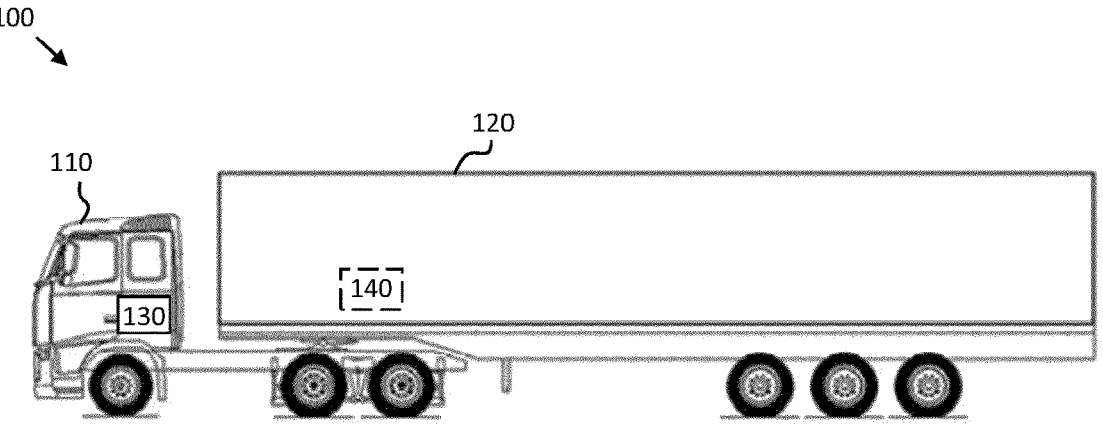
FIG. 1 schematically illustrates an example heavy-duty vehicle.
FIGS. 2-3 schematically illustrate minimum risk maneuvers.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1 illustrates an example vehicle 100 for cargo transport where the herein disclosed techniques can be applied with advantage. The vehicle 100 comprises a truck or towing vehicle 110 configured to tow a trailer unit 120 in a known manner. The example tractor 110 in FIG. 1 comprises a vehicle control unit (VCU) 130 configured to perform various vehicle control functions, such as vehicle motion management (VMM). The trailer unit 120 may optionally also comprise a VCU 140.

The vehicle 100 comprises a plurality of braked axles. The braked axles may comprise service brakes and/or parking brakes, where the service brakes are normally hydraulically or pneumatically actuated, while the parking brakes are normally based on spring force in a known manner.

FIG. 2 shows an example operating scenario 200, where a vehicle 100 is driving on a road having a certain drivable area 220 and where both lanes are in the same direction, i.e., there is no oncoming traffic as indicated by the dashed line arrows. It is normally desired to keep the vehicle on the road. Thus, veering to the right can be considered less desirable compared to veering to the left, simply since there is more room to the left in the example scenario 200, as shown in FIG. 2. Had the road instead been a two-directional road with oncoming traffic in the left lane, then the situation would likely have been different, and driving off the road would perhaps have been preferred compared to entering into the lane of the oncoming traffic.

A minimum risk manoeuvre (MRM) is a vehicle operation which is triggered to avoid some undesirable event, such as an accident. A common type of MRM is hard braking intended to bring the vehicle 100 to a halt as fast as possible but without making matter worse by, e.g., driving off the road or into some obstacle.

To improve vehicle safety, redundant systems are often incorporated in automated or semi-automated vehicles. Such redundancy may comprise, e.g., redundant steering devices, redundant service brake systems, and so on. The type of "steer-by-braking" described in US 2020/0290588 A1 is one example of steering system redundancy which is being considered for automated vehicles.

The parking brake system of a heavy-duty vehicle is often separate from the service brake system and based on spring-applied disk or drum brakes. The parking brake system can also be used for emergency braking, e.g., as part of a minimum risk manoeuvre.

A minimum risk manoeuvre is typically associated with a cone-ish shape 210 in front of the original position of the vehicle 100, which is an area enclosing a path potentially traversed by the vehicle during the manoeuvre, and where the vehicle may end up after coming to a full stop. The size of the cone often stands in direct proportion to the speed of the vehicle, and of course also depends on road friction, vehicle gross combination weight (GCW), and so on. An unknown or uncontrollable steering angle due to faults in the vehicle steering of course generates a wider cone, while braking faults that cause reduced braking capability result in longer cones, see in the longitudinal direction of the vehicle 100.

The potentially reached area 210 in FIG. 3 extends beyond the road and is therefore not acceptable in many use-cases, such as performing automated transportation on public roads, especially if the transportation involves dangerous goods. To ensure that the cone shape 210 does not extend beyond the road boundary, vehicle speed can be reduced, but operating heavy-duty vehicle transports at low speeds will result in a transportation efficiency penalty which is unacceptable.

FIG. 3 shows another example operating scenario 300, where the vehicle 100 is driving on the same road, but where the potentially reached area 310 has been tilted to the left. This means that a larger sized cone can be fitted into the road geometry, which in turn implies that vehicle speed can be increased compared to the case in FIG. 2 while still meeting safety requirements.

Considering faults in the steering system, it can be difficult to ensure a properly tilted reachable area. However, there are other ways to control the yaw of a vehicle, for example through uneven braking, as discussed above. However, as mentioned above, creating a safety critical system of this complexity can be difficult and it relies on several sensors and actuators which are difficult and costly to verify, both in terms of monetary cost as well as in terms of development time.

To provide a reliable, robust, mechanically simple, and low-cost means for tilting a potentially reached area as in FIG. 3, with reference also to FIG. 4, it is proposed to equip the vehicle 100 with a minimum risk maneuver brake system 400. The brake system comprises a first axle 410 comprising a left wheel 420 braking device 430 and a right wheel 440 braking device 450, where the braking devices 440, 450 are configured to apply a pre-determined difference in brake torque $T_L$, $T_R$ over the first axle, at least initially, in response to a brake signal 465.

This means that the vehicle 100 has been equipped with a brake system which is pre-configured to cause a desired drift D by the vehicle 100 during emergency braking. In other words, the difference in brake torque $T_L$, $T_R$ over the first axle can be configured in dependence of a preferred drift direction D by the vehicle 100 during, e.g., an emergency brake maneuver. Since the difference in brake torque is pre-configured and therefore not adjustable in real time, there is no possibility by the vehicle to change the difference during the maneuver, which means that the drift cannot be controlled in real time by using the first axle brake system alone. However, in return, the vehicle obtains a reliable way to tilt the cone shape in FIG. 2 into something resembling the cone shape in FIG. 3.

It is appreciated that the first axle 410 need not be a physical axle extending transversally across the entire vehicle. The techniques and arrangements disclosed herein are of course also applicable with wheel end modules which do not comprise a physical axle that connects the left wheel 420 to the right wheel 440.

According to aspects, the pre-determined difference in brake torque $T_L$, $T_R$ over the first axle is pre-configured in dependence of an automation use-case of the heavy-duty vehicle 100. This means that if we know that the vehicle 100 will be operated in autonomous mode, e.g., mainly on free-ways where there is no oncoming traffic then the torque difference $T_L$-$T_R$ can be configured to cause veering to the left during braking, as in FIG. 3. In case the vehicle 100 is then operated in other use-cases, then a speed limit may need to be imposed in order to prevent the potentially reached area from extending into the opposing traffic lane. As mentioned above, the left wheel 420 braking device 430 and the right wheel 440 braking device 450 advantageously form part of a parking brake system of the vehicle 100. The uneven torque distribution, i.e., the non-zero difference $T_L$-$T_R$ in the parking system will not be an issue if the parking brake system is used to maintain the vehicle in a stationary state when the vehicle is parked. However, if the parking brake system is engaged as part of an emergency braking maneuver, or as part of some other type of minimum risk maneuver, as proposed herein, then the uneven torque distribution will give rise to a veering by the vehicle in a preferred direction that depends on the sign of the torque distribution, i.e., if $T_L$<$T_R$ or if $T_L$>$T_R$, at least initially. It is appreciated that the herein disclosed techniques may be realized by selectively engaging brakes on one wheel of an axle, i.e., the case where $T_L$=0 or $T_R$=0, while $T_R$ #0 or $T_L$+0, respectively.

The left wheel 420 braking device 430 and the right wheel 440 braking device 450 may be realized as spring applied brakes with respective spring forces configured to generate the pre-determined difference in brake torque $T_L$, $T_R$ over the first axle. Thus, the spring force is selected at the factory, and the torque difference will then be pre-configured as a fixed difference in applied torque, whenever the brake system 400 on the first axle 410 is engaged.

However, there are also other options for achieving the pre-determined difference in brake torque $T_L$, $T_R$ over the first axle in response to the brake signal 465. For instance, the left wheel 420 braking device 430 and the right wheel 440 braking device 450 can be configured to be applied in response to the brake signal with a pre-determined time difference. Thus, the torques $T_L$ and $T_R$ in FIG. 4 may be of equal magnitude after a transient, where only one of the torques are applied. This transient will cause a yaw motion by the vehicle which in turn will result in a tilt of the potentially reachable area, as desired. In other words, the pre-determined difference in brake torque $T_L$, $T_R$ over the first axle in response to the brake signal 465 may only be present for an initial transient time duration following the onset of the brake signal 465.

Of course, there are many ways in which a pre-determined brake torque difference can be generated. Additional ways to provide a pre-determined level of uneven braking over a vehicle axle could be to build in a timing difference in the brake system. If the brakes are being applied slightly earlier on one side, it will create a jerk in that direction corresponding to the time difference. Additional pneumatic or hydraulic valves can also be added to the system, e.g. two valves will drain the pressure faster than one. Different specification valves can also be used on the different sides of the vehicle, one valve could for example be larger resulting in the air pressure being reduced faster. It is of course also possible to introduce a fixed delay to the control signal 465, causing an initial transient difference in brake torque over the axle. Notably, all of these arrangements are different from the type of known steer-by-braking systems discussed above, where the torque difference is controllable as opposed to being pre-determined.

FIGS. 5A-C illustrate further optional aspects of the disclosed techniques. FIG. 5A shows an example heavy-duty vehicle 100 comprising a tractor vehicle unit 110 with three axles 510, 520 and 530, and a trailer vehicle unit 120 with three axles 540, 550 and 560. It is appreciated that either of these axles may comprise the brake system 400 discussed above in connection to FIG. 4. However, one or more other axles may also comprise a brake system like that illustrated in FIG. 4, i.e., an arrangement configured to apply an uneven brake torque at right and left-hand side wheels. Consequently, there is also disclosed herein a brake system 400 comprising a second axle 510, 520, 530, 540, 550, 560 with a left wheel braking device and a right wheel braking device, where the braking devices of the second axle are configured to apply a pre-determined difference in brake torque over the second axle.

Advantageously, the pre-determined difference in brake torque over the second axle is of different sign compared to the pre-determined difference in brake torque over the first axle. For instance, if the first axle torque difference favors braking on the left-hand side wheel, such that the vehicle 100 veers to the left during braking, then the second axle torque difference is the opposite, such that the vehicle 100 veers to the right during braking. This arrangement provides a rudimentary steering function which is very robust and not likely to suffer failure, since there are no sensors involved, nor any advanced mechanical actuators.

Again, one or both of the first axle braking system and the second axle braking system may be based on a time difference during an initial transient phase of the applied braking torque, and/or on an actual difference in the magnitude of the applied torque.

FIGS. 5B and 5C illustrate how the tilt of the potentially reachable area can be selected in this manner. In FIG. 5B, the brake system on the axle 530 is activated, where the torque difference causes a tilt of the cone shape to the left. The opposite is achieved by activating the brake system on the axle 520, where the cone is instead tilted to the right, causing veering to the right.

Figure 6:
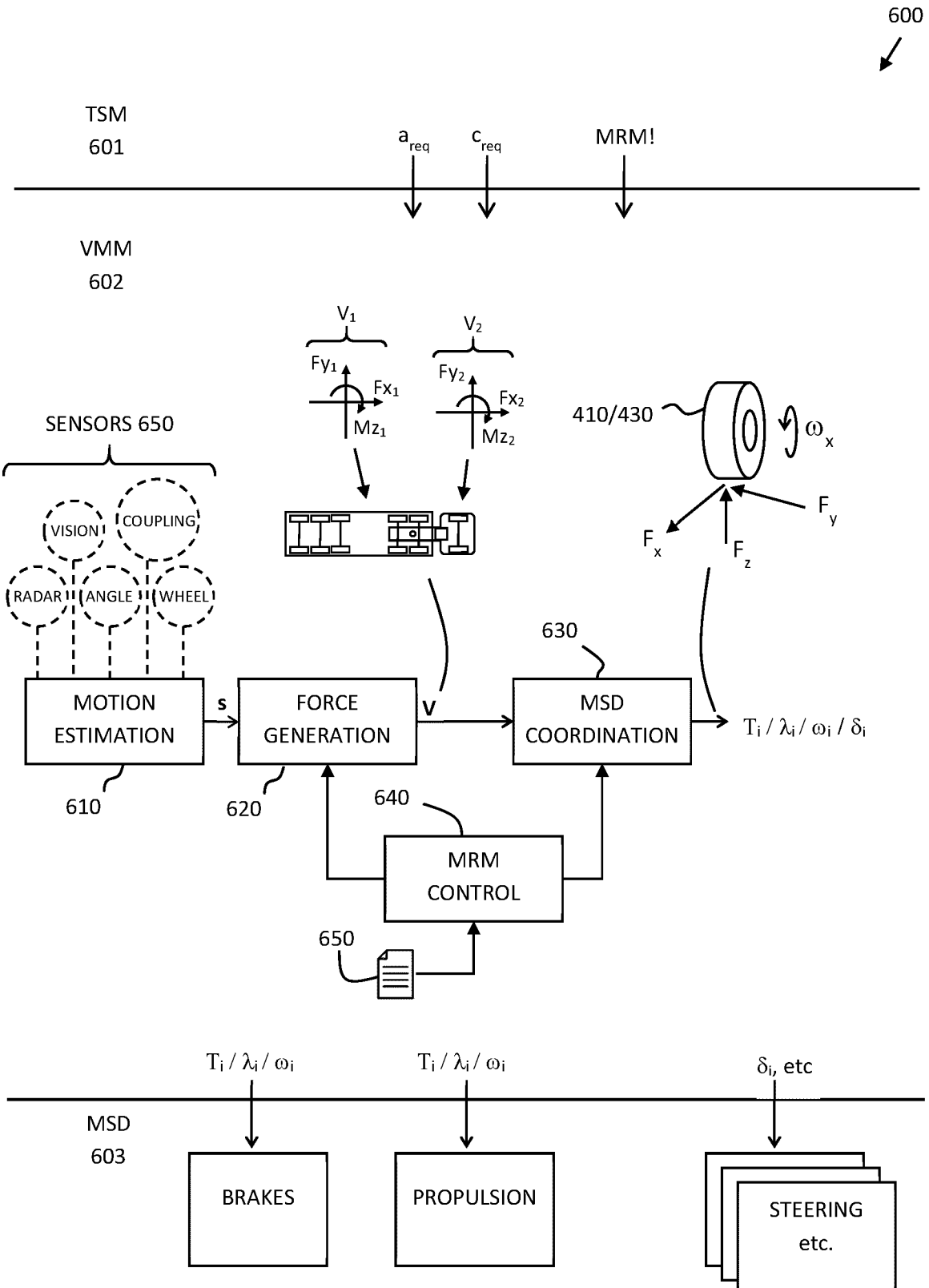
FIG. 6 illustrates a vehicle control function architecture.

The herein proposed techniques can of course be incorporated into advanced traffic situation management (TSM) and vehicle motion management (VMM) systems configured to control a heavy-duty vehicle, such as the vehicle 100 in FIG. 1. FIG. 6 schematically illustrates such a control system.

The TSM function 601 plans driving operations with a time horizon of, e.g., 1-10 seconds or so. This time frame corresponds to, e.g., the time it takes for the vehicle 100 to negotiate a curve or bring the vehicle 100 to a full stop as part of a minimum risk manoeuvre (MRM). The vehicle manoeuvres, planned and executed by the TSM, can be associated with acceleration profiles and curvature profiles which describe a desired vehicle velocity and turning for a given manoeuvre. The TSM continuously requests the desired acceleration profiles $a_{req}$ and curvature profiles $c_{req}$ from a VMM function 602 which performs force allocation to meet the requests from the TSM in a safe and robust manner and communicates requests to the different MSDs 603. The VMM function 602 manages both force generation and MSD coordination, i.e., it determines what forces that are required at the vehicle units in order to fulfil the requests from the TSM function 601, for instance to accelerate the vehicle according to a requested acceleration profile requested by TSM and/or to generate a certain curvature motion by the vehicle also requested by TSM. The forces may comprise e.g., yaw moments Mz, longitudinal forces Fx and lateral forces Fy, as well as different types of torques to be applied at different wheels.

The VMM function 602 operates with a time horizon of about 1 second or so, and continuously transforms the acceleration profiles $a_{req}$ and curvature profiles $c_{req}$ into control commands for controlling vehicle motion functions, actuated by the different MSDs of the vehicle 100, such as brakes, steering and propulsion devices, which report back capabilities to the VMM. The capabilities are in turn are used as constraints in the vehicle control. The VMM function 602 performs vehicle state or motion estimation 610, i.e., the VMM function continuously determines a vehicle state s comprising positions, speeds, accelerations, and articulation angles of the different units in the vehicle combination by monitoring operations using various sensors 650 arranged on the vehicle 100, often but not always in connection to the MSDs.

The result of the motion estimation 610, i.e., the estimated vehicle state s, is input to a force generation module 620 which determines the required global forces $V=[V_1, V_2]$ for the different vehicle units to cause the vehicle 100 to move according to the requested acceleration and curvature profiles $a_{req}$, $c_{req}$. The required global force vector V is input to an MSD coordination function 630 which allocates wheel forces and coordinates other MSDs such as steering and suspension. The coordinated MSDs then together provide the desired lateral Fy and longitudinal Fx forces on the vehicle units, as well as the required moments Mz, to obtain the desired motion by the vehicle combination 100.

The control architecture 600 may, e.g., form part of the vehicle control unit 130, and/or the trailer control unit 140. According to some aspects, the control unit 130, 140, 460, 600 arranged for vehicle motion management of a heavy-duty vehicle 100. The control unit comprises a minimum risk maneuver (MRM) control module 640 configured to assist in performing an MRM. The MRM control module 640 is arranged to obtain data 650 associated with a brake system 400 of the vehicle 100, where the data 650 is indicative of a pre-determined difference in brake torque $T_L$, $T_R$ over a first axle of the vehicle 100. This means that the pre-configured brake torque difference aspects of the herein disclosed brake systems can be incorporated into the overall vehicle control system and exploited as needed to achieve a given desired vehicle motion. This tool represents a robust way for the VMM to implement veering in a given direction, simply by engaging the brake system.

According to some aspects, as discussed above, the data 650 is also indicative of a pre-determined difference in brake torque $T_L$, $T_R$ over a second axle of the vehicle 100. This allows the control unit 460, 600 to perform MSD coordination to steer the vehicle 100 during, e.g., an MRM by selectively applying brake torque by the brake system 400 on the first axle and/or on the second axle. This enables the vehicle 100 to perform other more advanced MRMs, such as evasive maneuvers and the like, by engaging very rudimentary MSDs which are most likely highly trustworthy due to their mechanic simplicity.

Figure 7:
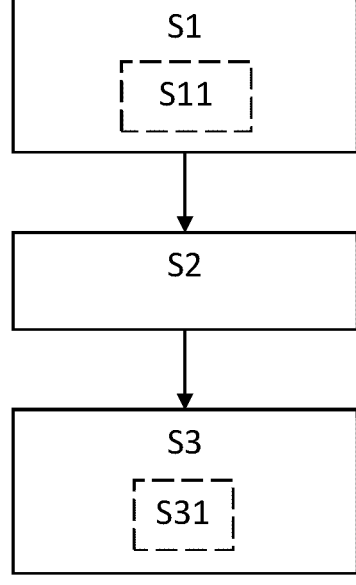
FIG. 7 is a flow chart illustrating a method.

FIG. 7 is a flow chart which illustrates a method performed in a vehicle 100. The method comprises pre-configuring S1 a brake system 400 comprising a first axle 410 with a left wheel 420 braking device 430 and a right wheel 440 braking device 450, where the braking devices 440, 450 of the first axle are configured to apply a pre-determined difference in brake torque $T_L$, $T_R$ over the first axle in response to a brake signal 465, detecting S2 an emergency situation, and executing S3 a minimum risk maneuver by the vehicle 100 comprising activating the brake system 400.

According to aspects, the method further comprises pre-configuring S11 the brake system 400 with a second axle 510, 520, 530, 540, 550, 560 having a left wheel braking device and a right wheel braking device, where the braking devices of the second axle are configured to apply a pre-determined difference in brake torque over the second axle with a different sign compared to the pre-determined difference in brake torque $T_L$, $T_R$ over the first axle, and where the minimum risk maneuver comprises performing S31 motion support device, MSD, coordination to steer the vehicle 100 during the minimum risk maneuver by selectively applying brake torque by the brake system 400 on the first axle and on the second axle.

Figure 8:
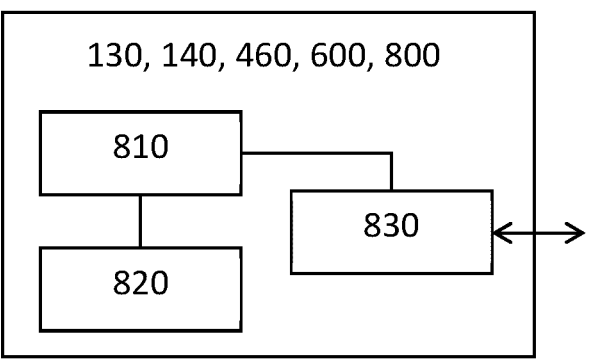
FIG. 8 schematically illustrates a control unit.

FIG. 8 schematically illustrates, in terms of a few functional units, the components of a control unit 130, 140, 460, 600, 800 according to embodiments of the discussions herein. This control unit may be comprised in the vehicle 100, e.g., in the form of a VMM unit. Processing circuitry 810 is provided using any combination of one or more of a suitable central processing unit CPU, multiprocessor, microcontroller, digital signal processor DSP, etc., capable of executing software instructions stored in a computer program product, e.g. in the form of a storage medium 830. The processing circuitry 810 may further be provided as at least one application specific integrated circuit ASIC, or field programmable gate array FPGA.

Particularly, the processing circuitry 810 is configured to cause the control unit 800 to perform a set of operations, or steps, such as the methods discussed in connection to FIG. 7. For example, the storage medium 830 may store the set of operations, and the processing circuitry 810 may be configured to retrieve the set of operations from the storage medium 830 to cause the control unit 800 to perform the set of operations. The set of operations may be provided as a set of executable instructions. Thus, the processing circuitry 810 is thereby arranged to execute methods as disclosed herein.

The storage medium 830 may also comprise persistent storage, which, for example, can be any single one or combination of magnetic memory, optical memory, solid state memory or even remotely mounted memory.

The control unit 800 may further comprise an interface 820 for communications with at least one external device. As such the interface 820 may comprise one or more transmitters and receivers, comprising analogue and digital components and a suitable number of ports for wireline or wireless communication.

The processing circuitry 810 controls the general operation of the control unit 800, e.g., by sending data and control signals to the interface 820 and the storage medium 830, by receiving data and reports from the interface 820, and by retrieving data and instructions from the storage medium 830. Other components, as well as the related functionality, of the control node are omitted in order not to obscure the concepts presented herein.

Figure 9:
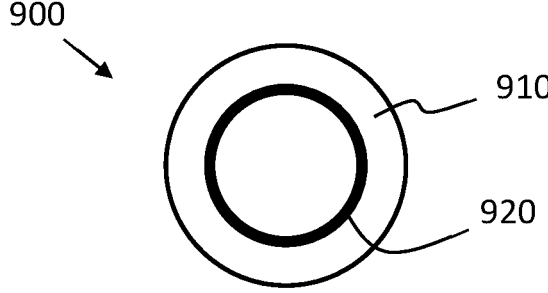
FIG. 9 shows a computer program product.

FIG. 9 illustrates a computer readable medium 910 carrying a computer program comprising program code means 920 for performing the methods illustrated in FIG. 7, when said program product is run on a computer. The computer readable medium and the code means may together form a computer program product 900.

The invention claimed is:

1. A minimum risk maneuver, MRM, brake system for a heavy-duty vehicle, the brake system comprising:
    a first axle comprising a left wheel braking device and a right wheel braking device, where the braking devices are configured to apply a pre-determined difference in brake torque, at least initially, over the first axle in response to a brake signal,
    where the pre-determined difference in brake torque over the first axle is configured in dependence of a preferred drift direction by the vehicle during an MRM comprising braking, and where the left wheel braking device and the right wheel braking device form part of a parking brake system of the vehicle.

2. The brake system according to claim 1, where the pre-determined difference in brake torque over the first axle is also pre-configured in dependence of an automation use-case of the heavy-duty vehicle.

3. The brake system according to claim 1, where the MRM is an emergency brake maneuver.

4. The brake system according to claim 1, where the left wheel braking device and the right wheel braking device are spring applied brakes with respective spring forces configured to generate the pre-determined difference in brake torque over the first axle.

5. The brake system according to claim 1, where the left wheel braking device and the right wheel braking device are configured to be applied in response to the brake signal with a pre-determined time difference.

6. The brake system according to claim 1, comprising a second axle with a left wheel braking device and a right wheel braking device, where the braking devices of the second axle are configured to apply a pre-determined difference in brake torque over the second axle.

7. The brake system according to claim 6, where the pre-determined difference in brake torque over the second axle is of different sign compared to the pre-determined difference in brake torque over the first axle.

8. A heavy-duty vehicle comprising a brake system according to claim 1.

9. A control unit arranged for vehicle motion management, VMM, of a heavy-duty vehicle, the control unit comprising a minimum risk maneuver, MRM, control module configured to assist in performing an MRM comprising braking wherein the MRM control module is arranged to obtain data associated with a brake system of the vehicle, where the data is indicative of a pre-determined difference in brake torque over a first axle of the vehicle, where the pre-determined difference in brake torque over the first axle is configured in dependence of a preferred drift direction by the vehicle during the MRM.

10. The control unit according to claim 9, where the data is also indicative of a pre-determined difference in brake torque over a second axle of the vehicle, wherein the control unit is arranged to perform motion support device, MSD, coordination to steer the vehicle during a minimum risk maneuver by selectively applying brake torque by the brake system on the first axle and on the second axle.

11. A method performed in a vehicle, the method comprising:
    pre-configuring a brake system comprising a first axle with a left wheel braking device and a right wheel braking device, where the braking devices of the first axle are configured to apply a pre-determined difference in brake torque over the first axle in response to a brake signal, where the pre-determined difference in brake torque over the first axle is configured in dependence of a preferred drift direction by the vehicle during a minimum risk maneuver, MRM, where the left wheel braking device and the right wheel braking device form part of a parking brake system of the vehicle,
    detecting an emergency situation, and
    executing the MRM by the vehicle comprising activating the brake system.

12. The method according to claim 11, further comprising pre-configuring the brake system with a second axle having a left wheel braking device and a right wheel braking device, where the braking devices of the second axle are configured to apply a pre-determined difference in brake torque over the second axle with a different sign compared to the pre-determined difference in brake torque over the first axle, and where the minimum risk maneuver comprises performing motion support device, MSD, coordination to steer the vehicle during the MRM by selectively applying brake torque by the brake system on the first axle and/or on the second axle.

13. A non-transitory computer readable medium carrying a computer program comprising program code for performing the steps of claim 11 when said program code is run on a computer or on processing circuitry of a control unit.

5

\* \* \* \* \*